United States Patent [19]

Klauck

[11] Patent Number: 4,695,232
[45] Date of Patent: Sep. 22, 1987

[54] CENTRAL BODY TO WHICH ARE CONNECTED BOTH A DRIVING MOTOR AND A PUMP

[75] Inventor: Manfred Klauck, Lebach, Fed. Rep. of Germany

[73] Assignee: Flutec Fluidtechinische Gerate GmbH, Sulzbach, Fed. Rep. of Germany

[21] Appl. No.: 686,260

[22] PCT Filed: Apr. 6, 1984

[86] PCT No.: PCT/DE84/00080
§ 371 Date: Dec. 6, 1984
§ 102(e) Date: Dec. 6, 1984

[87] PCT Pub. No.: WO84/03915
PCT Pub. Date: Oct. 11, 1984

[30] Foreign Application Priority Data
Apr. 7, 1983 [DE] Fed. Rep. of Germany ....... 3312490

[51] Int. Cl.⁴ ............................................ F04B 23/02
[52] U.S. Cl. ....................................... 417/410; 60/456
[58] Field of Search ............... 60/456; 92/144; 417/410, 372, 423 H

[56] References Cited
U.S. PATENT DOCUMENTS 3,751,191  8/1973  Mott ................................. 60/456 X
4,172,697 10/1979  Schoen ............................. 417/372
4,283,167  8/1981  Bassan et al. ....................... 418/13
4,461,341  7/1984  Morrison ........................ 60/456 X

FOREIGN PATENT DOCUMENTS 2626770 12/1977  Fed. Rep. of Germany ........ 60/456
2750967  4/1979  Fed. Rep. of Germany .
1255533  2/1962  France .
2288241  5/1976  France .
 534943  3/1941  United Kingdom .................. 60/456

Primary Examiner—Carlton R. Croyle
Assistant Examiner—Theodore Olds
Attorney, Agent, or Firm—Roylance, Abrams, Berdo & Goodman

[57] ABSTRACT

A central body connects a driving motor and a pump driven by the driving motor through a shaft and a coupling. The hollow central body surrounds the coupling, connected on one side to the driving motor and connected on the other side to the pump. A fan is arranged in the central body and is connected with an inlet and an outlet. The central body has a heat exchanger through which the outlet from the fan is conducted. To further develop and improve this apparatus, a pressure medium tank is mounted in the central body and surrounds the driving shaft at some distance. The pump is connected with the pressure medium tank through its suction connector. The inlet to the fan is provided on the side of the driving motor.

12 Claims, 3 Drawing Figures

CENTRAL BODY TO WHICH ARE CONNECTED BOTH A DRIVING MOTOR AND A PUMP

FIELD OF THE INVENTION

The present invention relates to a hydraulic powered apparatus with a central body connecting the driving motor and the pump and housing a fan and the hydraulic fluid tank.

BACKGROUND OF THE INVENTION

A known device of this type cools the pressure medium conveyed from the pump with a fan. The fan outlet passes through a heat exchanger (DE-PS No. 27 50 967).

SUMMARY OF THE INVENTION

An object of the present invention is to further develop and improve the known device.

The foregoing object is obtained by a hydraulic powered apparatus comprising a driving motor, a pump coupled to the motor by a shaft and a coupling such that the driving motor powers the pump, a hollow central body having opposite ends connected to the driving motor and the pump and surrounding the coupling, a fan mounted on the shaft and inside the central body, a heat exchanger adjacent to and receiving air from the fan outlet and a pressure medium tank. The tank is mounted within the central body, surrounds and is spaced radially from the shaft and is connected to the suction side of the pump.

According to the present invention, the pressure medium is held in a pressure medium tank fitted into the central body. The entire arrangement is such that the pressure medium tank is integrated in a favorable manner into the apparatus, and the space is properly utilized. The apparatus is far more useful than the known device, due to the inclusion of the pressure medium tank. During operation of the apparatus according to the present invention, not only is the pressure medium flowing through the heat exchanger cooled, but also the pressure medium found in the pressure medium tank is cooled. Since parts of the wall of the pressure medium tank also form the wall of the fan housing, the tank walls are continually affected by the air sucked in by the fan during operation. Additional peripheral devices can be attached to the central body.

A favorable mounting of the driving motor on the central body, so that air can be drawn in by the fan from between the driving motor and the central body, is made possible by a fastening flange on the motor attached to the central body at opposite side edges of the flange and by the fan inlet being between the flange and central body and outside the flange side edges.

A space-saving arrangement of the heat exchanger and a filter in the central body is attained by mounting the heat exchanger on top of the central body, providing a return line connector on the pump side adjacent a central body side and the heat exchanger, and mounting a reverse flow filter adjacent the other central body side.

A short line connection can be provided between the pressure medium pump on the one side and the pressure medium tank. A hydraulic device can be mounted in the central body.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF PREFERRED EMBODIMENT

Figure 1:
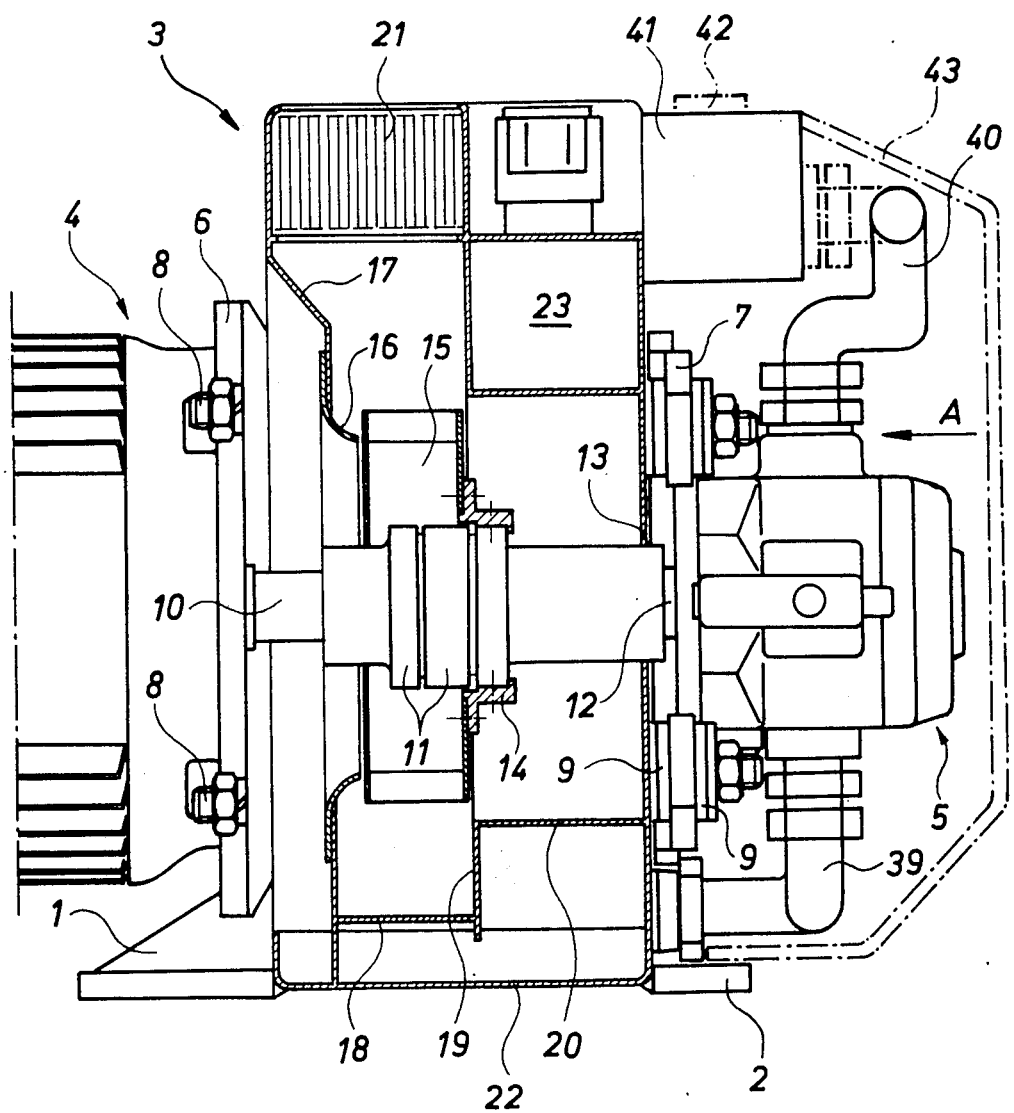
FIG. 1 is a side elevational view partially in section of a hydraulic powered apparatus according to the present invention.
Figure 2:
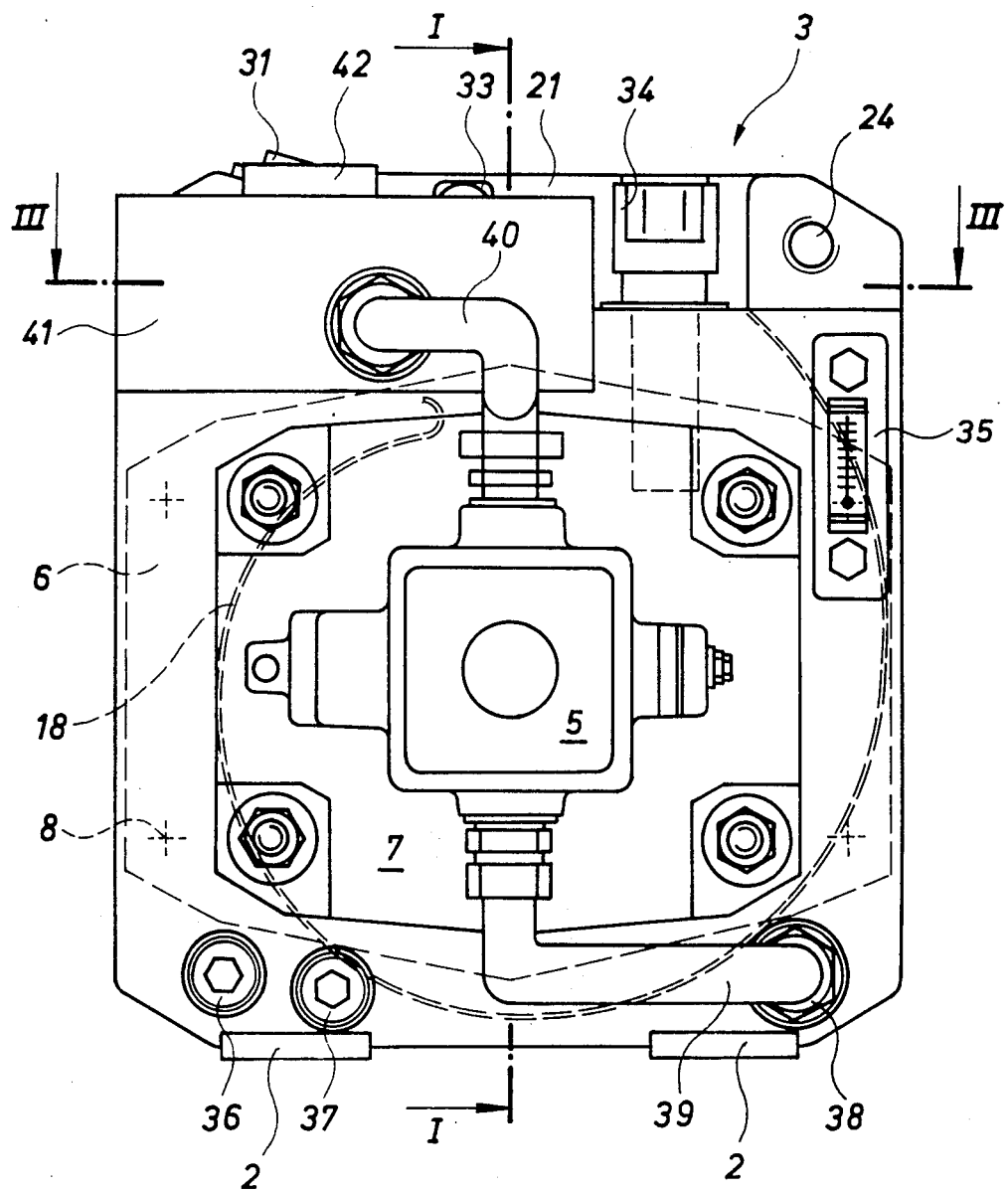
FIG. 2 is an end elevational view of the apparatus taken in the direction A of FIG. 1.

FIG. 1 shows an essentially quadratic, hollow central body 3 with pedestals 1 and 2. A driving motor 4 is on the left side of the central body, and a pump 5 is on the right side of the central body. The motor and pump are mounted on the central body with respective fastening flanges 6 and 7. Fastening flange 6 of driving motor 4, shown in broken lines in FIG. 2, is essentially rectangular and fastened by screws 8 on both of its opposite side edges. Fastening flange 7 of pump 5 is coupled to body 3 by at least one connecting screw. Flexible, generally rubber plates 9 are mounted on the connecting screw and abut flange 7. Pump 5 is flexibly connected with body 3 by means of flexible plates 9. A flexible connection of the driving motor to central body 3 is likewise possible.

A driving shaft 10 extending from the motor is connected through a coupling 11 with a driving shaft 12 of the pump. Coupling 11 is located inside central body 3. Between coupling 11 and the right side of central body 3 (as illustrated in the drawing), a narrow annular clearance 13 is provided, which clearance can be closed by a sliding packing.

A fan 15 is mounted by a holder 14 on the right part of coupling 11 (as illustrated in the drawing). Fan 15 extends axially along driving shaft 10 to the left as seen from the middle of central body 3. A deflector 16 of sheet metal and configured similar to the bell of a trumpet is mounted on a deflector wall 17 in central body 3 adjacent fan 15. FIG. 1 shows deflector wall 17 configured so that air can be guided between fastening flange 6 and deflector wall 17 to deflector 16, and then to fan 15. Fan 15 is surrounded radially by a spiral fan housing 17 (FIGS. 1 and 2). A fan housing wall 19, perpendicular to the longitudinal axis of driving shaft 10 and approximately in the middle of body 3, extends from outside the fan almost as far as fan 15. In the drawing, a cylindrical fan housing wall 20 is directly adjacent to the fan. A heat exchanger 21 is arranged over fan 15 in body 3. The fan housing 18, walls 19 and 20 and an outside wall 22 define a pressure medium tank 23, which surrounds fan 15 and coupling 11, except for the area of heat exchanger 21.

Figure 3:
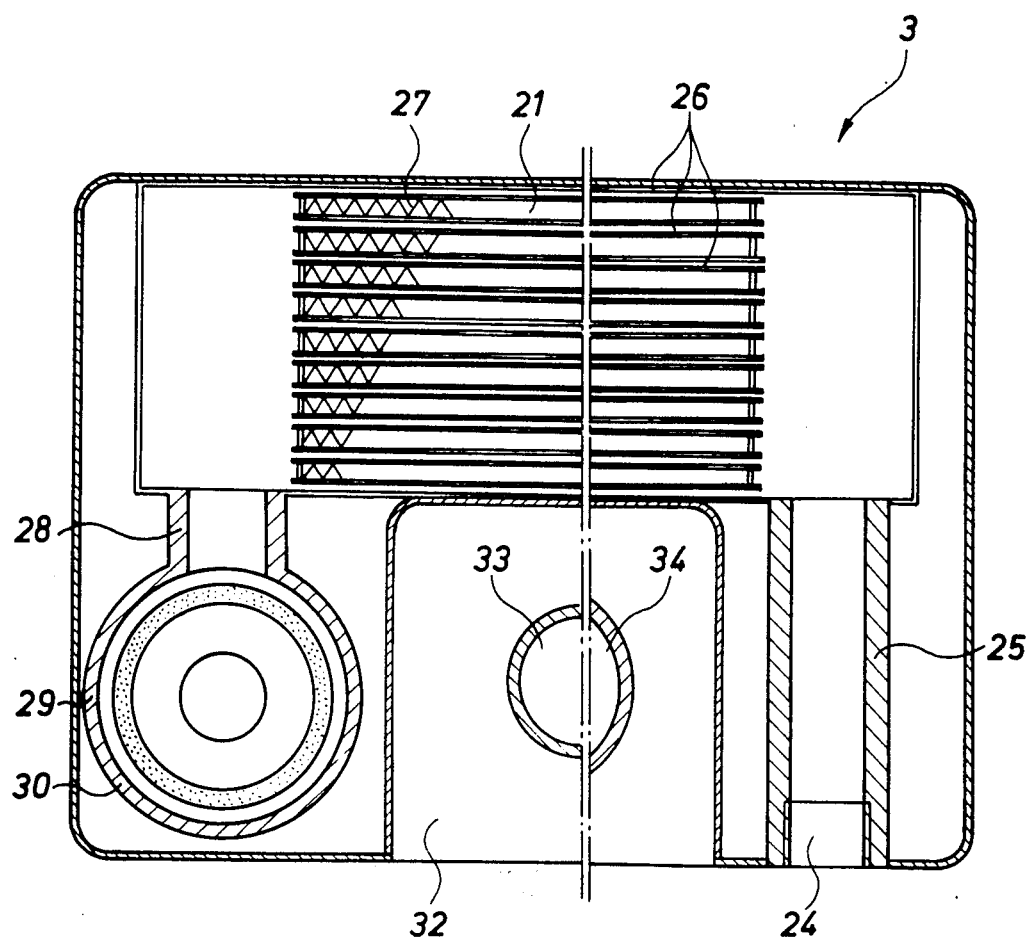
FIG. 3 is a top view in section of the apparatus taken along line III—III of FIG. 2.

FIG. 2 shows a connector 24 at the top right of the drawing, for pressure medium flowing in a reverse direction. Connector 24 is connected through a pipe 25 with channels 26 of heat exchanger 21, between which channels are arranged cooling plates 27 (FIG. 3). On the left side of FIG. 3, heat exchanger 21 is connected through a channel 28 with a filter housing 29 receiving a filter 30. The filter is accessible from the outside through a screw cover 31 (FIG. 2). Filter 30 is arranged in the top of pressure medium tank 23.

Pipe 25, heat exchanger 21 and filter housing 29 are surrounded by a housing part of central body 3. The central body has an indentation 32 between channel 25, heat exchanger 21 and filter housing 29 for attachment of a connector 33 to receive a float and temperature switch. This switch is immersed in pressure medium tank 23. A connector 34 to receive a filling and ventilation filter is also connected with pressure medium tank 23. FIG. 2 shows a display glass 35 on the right top side, indicating the pressure medium level in tank 23. In the left bottom corner of FIG. 2, two connectors 36 and 37 to the pressure medium tank are provided. At least one of the connectors, e.g., connector 37, can be connected with a storage tank.

At the right bottom of FIG. 2, a suction connector 38 to pressure medium tank 23 is provided. Connector 38 is connected through a flexible line 39 with the suction side of pump 5. The pressure side of pump 5 is connected through a flexible line 40 with a hydraulic device 41, especially a hydraulic control having a connector 42 leading to a user. Hydraulic device 41 is mounted in body 3 above pump 5.

Central body 3 can be surrounded on the side of pump 5 by a bell-shaped hood 43, shown in broken lines in FIG. 1. The hood can be fastened to the central body.

During operation, air is drawn in by fan 15 between fastening flange 6 and deflector wall 17 on the side of central body 3 connected with driving motor 4. The air is then blown to the outside through heat exchanger 21 by means of spiral air deflector 18. The air guided through central body 3 serves to cool pressure medium found in pressure medium tank 23 and especially in heat exchanger 21. Pressure medium is drawn by pump 5 through suction connector 38 out of tank 23 and is conveyed to the hydraulic device 41. From device 41, according to the setting of the hydraulic device, the pressure medium is conveyed either to the user, from where it returns through connector 24 into pressure medium tank 23, or through a connection directly back into the pressure medium tank.

If pressure medium tank 23 surrounds fan 15 at some distance, and if the wall shown to the right of fan 15 in FIG. 1 is open corresponding to the diameter of fan 15, with the adapted configuration of coupling 11, fan 15 and pump 5 could be removed in a simple manner following detachment of fastening flange 7 from driving motor 4. A simple detachment of pump 5 from driving motor 4 is advantageous, because the life of pump 5 is much shorter than the life of driving motor 4. Therefore, the pump must be changed more often. A packing can be provided and held by flange 7 to pack the clearance between the driving collar of coupling 11 and pressure medium tank 23. This driving collar can project through such packing. If fan 15 does not need to be removed from the central body, the air deflector wall 20, forming inner wall of pressure tank 23, can be of smaller diameter than fan 15.

While a particular embodiment has been chosen to illustrate the invention, it will be understood by those skilled in the art that various changes and modifications can be made therein without departing from the scope of the invention as defined in the appended claims.

I claim:

1. A hydraulic powered apparatus, comprising:
   a driving motor;
   a pump coupled to said motor by a shaft and a coupling such that said driving motor powers said pump, said pump having a suction connector;
   a hollow central body having opposite ends connected to said driving motor and said pump and surrounding said coupling;
   a fan mounted on said shaft inside said central body and connected with a fan inlet and a fan outlet, said fan inlet being at the end of said central body adjacent said driving motor;
   a heat exchanger located within said central body adjacent and receiving air from said fan outlet;
   a hydraulic pressure medium tank mounted within said central body, said tank surrounding and being spaced at a radial distance from said shaft, said tank being connected to said suction connector of said pump such that hydraulic pressure medium from said pressure medium tank is pressurized by said pump.

2. A hydraulic powered apparatus according to claim 1 wherein said driving motor comprises a fastening flange attached to said central body at two opposite side edges of said fastening flange, said fan inlet being between said fastening flange and said central body and outside said side edges.

3. A hydraulic powered apparatus according to claim 2 wherein said heat exchanger is mounted on top of said central body; a return line connector is provided on a side of said pump adjacent one side of said central body and adjacent said heat exchanger; and a reverse flow filter is mounted adjacent another side of said central body.

4. A hydraulic powered apparatus according to claim 1 wherein said heat exchanger is mounted on top of said central body; a return line connector is provided on a side of said pump adjacent one side of said central body and adjacent said heat exchanger; and a reverse flow filter is mounted adjacent another side of said central body.

5. A hydraulic powered apparatus according to claim 1 wherein said pump is connected through a first flexible line with an outlet on an adjacent side of said tank and through a second flexible line on a side of said pump with a hydraulic device attached to said central body.

6. A hydraulic powered apparatus according to claim 1 wherein a bell-shaped hood is attached to said central body and covers said central body on said end adjacent said pump.

7. A hydraulic powered apparatus according to claim 1 wherein said tank surrounds said fan and is spaced a radial distance therefrom; and said central body has an outlet between said fan and said pump for removing said fan from said body.

8. A hydraulic powered apparatus according to claim 1 wherein said tank surrounds said fan and is spaced a radial distance therefrom.

9. A hydraulic powered apparatus according to claim 1 wherein said heat exchanger spaced by a radial distance from said fan.

10. A hydraulic powered apparatus according to claim 1 wherein said heat exchanger extends about only a portion of the fan periphery.

11. A hydraulic powered apparatus according to claim 1 wherein said heat exchanger is spaced from said fan by a greater radial distance than said pressure medium tank such that air conveyed by said fan cools said pressure medium tank before cooling said heat exchanger.

12. A hydraulic powered apparatus according to claim 1 wherein said heat exchanger is mounted on top of said central body; and a return line connector is provided on a side of said pump adjacent one side of said central body and adjacent said heat exchanger.

* * * * *